Sept. 3, 1946.   W. T. ROSSELL   2,407,035
BRAKE SHOE
Filed Jan. 22, 1945

Inventor
WILLIAM T. ROSSELL

By
Attorney

Patented Sept. 3, 1946

2,407,035

UNITED STATES PATENT OFFICE 2,407,035

BRAKE SHOE

William T. Rossell, New York, N. Y., assignor to Transit Research Corporation, New York, N. Y., a corporation of New York Application January 22, 1945, Serial No. 573,832

4 Claims. (Cl. 188—1)

This invention relates to brake shoes for vehicles and has for its object to provide a shoe which incorporates thermally responsive means for releasing the shoe from a brake application in case the shoe becomes overheated.

The shoe herein contemplated has particularly advantageous use in two types of braking: first in the case of spring applied brakes in which a brake shoe may be applied accidentally by reason of local equipment failure, and, secondly, in a hand operated or parking brake in cases where an operator fails to release the brake before operating the vehicle. In both instances, the shoe may attain very high temperatures under continued operation of the vehicle. The principal object of the invention is to provide a brake shoe, actuating means for expanding said shoe against a brake drum and means between the actuating means and the shoe operative in response to a predetermined high temperature for rendering the actuating means ineffective to maintain the brake application.

Another object is to provide a fusible means between a brake shoe expanding means and a brake shoe which is economical to make, easy to install and readily replaced after usage.

Figure 1:
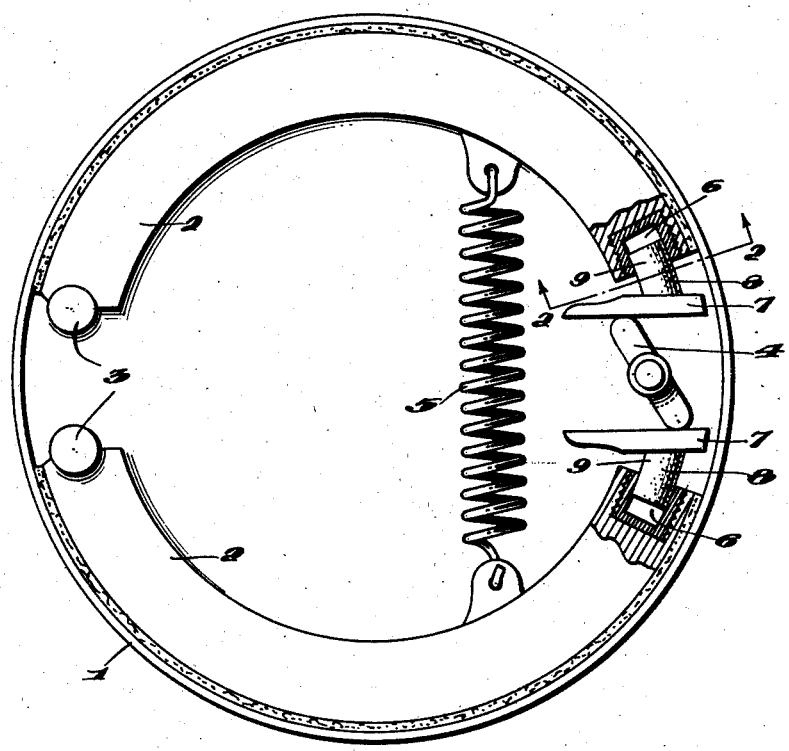
Figure 2:
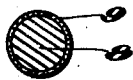

Other objects and advantages will become hereinafter more fully apparent as reference is had to the accompanying drawing in which my invention is illustrated and in which Figure 1 is a side elevation of a brake assembly embodying my invention, and Figure 2 is a diametric section taken along the line 2—2 of Figure 1.

More particularly, 1 indicates a brake drum which has two brake shoes 2 pivotally mounted therein at 3 so that they may pivot away from said drum and into frictional contact therewith. The shoes are actuated or applied against said drum by a cam control means 4 which may be operated manually or in any desired manner. A retracting tension spring 5 connects the shoes and draws the shoes away from the drum 1.

The brake, above described and illustrated, is exemplary only and may be of any conventional or special type with the exception that the ends of the shoes 2 adjacent the actuator 4 are each drilled and threaded to receive a hollow plug 6 which, in turn, receives a tappet composed of a head 7 and a shank 8. The shanks 8 are coated with a solder 9 which will melt at a predetermined temperature, the temperature selected being such that if the brake shoes become or are left in applied position during operation of the vehicle so that heat is generated between the shoes and the drum the solder will melt and the brakes will be released. The solder holds the shanks partially within the bores of the plugs 6 and serves as a normal motion transmitting means from the cam 4 to the shoes. The release is accomplished by melting of the solder thus permitting full penetration of the shanks into their bores. This not only foreshortens the shoes so that the spring 5 can retract them from contact with the shoes but prevents reapplication of the shoes to the drums until the tappets are rigidly restored to their original positions as illustrated in Figure 1. This will have to be done in a shop or car barn and can be done at the end of the run in which the release has occurred by unscrewing the plugs 6 with the tappets and replacing them with new plugs and tappets.

Various modifications may be made within the scope of my invention and I desire to be extended protection within the scope of the appended claims.

What I claim is:

1. The combination of a vehicle brake comprising a fixed and a relatively movable friction element, brake applying means operable to apply said movable element to said fixed element, means for retracting said movable element from said fixed element, and thermally responsive means interposed between said brake applying means and said movable element operative upon the attainment of a predetermined temperature of said movable element to cause the operation of said retracting means and also to prevent reapplication of the brake by said applying means.

2. In a vehicle brake, a brake drum, pivotally mounted brake shoes, brake applying means for expanding said shoes against said drum, means for retracting said shoes from contact with said drum and thermally responsive means associated with at least one of said shoes for causing the operation of said means for retracting shoes upon attainment of a predetermined temperature by the shoe with which it is associated.

3. In a vehicle brake, a brake drum, two pivotally mounted brake shoes in said drum, brake applying means located between the ends of said shoes for applying said shoes to said drum, spring means for retracting said shoes from said drum and thermally responsive means between said brake applying means and at least one of said shoes operative to collapse in response to the attainment of a predetermined temperature whereby said spring means retracts said shoe from said drum.

4. In a vehicle brake, a brake drum, a brake shoe pivotally mounted adjacent said drum, brake actuating means operable against said shoe to press said shoe into frictional contact with said drum, said shoe having a bore in one end thereof, a tappet having a shank extending partially into said bore, the head of said tappet being positioned for contact by said brake actuating means, said tappet being supported in said bore by a solder having a predetermined melting temperature whereby said tappet fully seats into said bore upon heating of said brake shoe beyond said predetermined temperature.

WILLIAM T. ROSSELL.